(12) United States Patent
Kasslatter et al.

(10) Patent No.: US 9,893,869 B2
(45) Date of Patent: Feb. 13, 2018

(54) RADIO TRANSMISSION/RADIO RECEPTION DEVICE AND METHOD FOR COMMUNICATION WITHIN A, IN PARTICULAR WIRELESS, MOTOR VEHICLE COMMUNICATION SYSTEM INTERACTING IN AD-HOC FASHION

(75) Inventors: Fritz Kasslatter, Gablitz (AT); Thomas Ritter, Vienna (AT)

(73) Assignee: Siemens Aktiengesellschaft, München (DE)

( * ) Notice: Subject to any disclaimer, the term of this patent is extended or adjusted under 35 U.S.C. 154(b) by 212 days.

(21) Appl. No.: 14/128,604

(22) PCT Filed: Oct. 26, 2011

(86) PCT No.: PCT/EP2011/068750
§ 371 (c)(1),
(2), (4) Date: Dec. 21, 2013

(87) PCT Pub. No.: WO2012/175146
PCT Pub. Date: Dec. 27, 2012

(65) Prior Publication Data
US 2014/0126557 A1    May 8, 2014

(30) Foreign Application Priority Data

Jun. 21, 2011   (DE) .................... 10 2011 077 882

(51) Int. Cl.
*H04L 5/00* (2006.01)
*H04W 84/18* (2009.01)
(Continued)

(52) U.S. Cl.
CPC .......... *H04L 5/0091* (2013.01); *H04W 84/18* (2013.01); *H04W 8/005* (2013.01); *H04W 72/1252* (2013.01)

(58) Field of Classification Search
None
See application file for complete search history.

(56) References Cited

U.S. PATENT DOCUMENTS 5,933,420 A * 8/1999 Jaszewski ............. H04W 16/14
                                                                  370/329
7,966,419 B2    6/2011 Mosko et al.
(Continued)

FOREIGN PATENT DOCUMENTS

DE    102008015778 A1    10/2009
JP       2006209333 A     8/2006
(Continued)

OTHER PUBLICATIONS

Papadimitratos, Panos et al. Vehicular Communication Systems: Enabling Technologies, Applications, and Future Outlook on Intelligent Transportation, Nov. 2009, IEEE Communications, Topics in Automotive Netowrking, pp. 84-87.*
(Continued)

*Primary Examiner* — Noel Beharry
*Assistant Examiner* — Rodrick Mak
(74) *Attorney, Agent, or Firm* — Lempia Summerfield Katz LLC (57) ABSTRACT

The invention relates to a radio transmission/radio reception device and to a method for communication within a, in particular wireless, motor vehicle communication system interacting in ad-hoc fashion which are configured such that the radio transmission/radio reception device emits a piece of information about the scope of envisaged reports, at least one further radio transmission/radio reception device receives the information, and the further radio transmission/radio reception device takes the received information as a basis for stipulating a frequency for the emission of chronologically successive reports.

46 Claims, 2 Drawing Sheets

(51) Int. Cl.
  *H04W 8/00*  (2009.01)
  *H04W 72/12*  (2009.01)

(56) References Cited

U.S. PATENT DOCUMENTS

| | | | |
|---|---|---|---|
| 2002/0163912 A1* | 11/2002 | Carlson | H04L 45/122 370/392 |
| 2003/0128690 A1 | 7/2003 | Elliott et al. | |
| 2004/0042417 A1 | 3/2004 | Kennedy | |
| 2004/0073361 A1* | 4/2004 | Tzamaloukas | G01C 21/3691 701/414 |
| 2004/0230345 A1* | 11/2004 | Tzamaloukas | G01C 21/26 701/1 |
| 2005/0135295 A1* | 6/2005 | Walton | H04W 74/0816 370/328 |
| 2005/0250515 A1* | 11/2005 | Oka | H04L 67/12 455/456.1 |
| 2007/0117525 A1* | 5/2007 | Osafune | G08G 1/20 455/99 |
| 2007/0127419 A1 | 6/2007 | Sapek | |
| 2007/0223412 A1* | 9/2007 | Lott | H04W 56/00 370/310.1 |
| 2008/0002573 A1 | 1/2008 | Mosko et al. | |
| 2008/0112340 A1* | 5/2008 | Luebke | H04W 72/085 370/310 |
| 2010/0097924 A1* | 4/2010 | Yamaguchi | H04L 1/0009 370/216 |
| 2010/0198459 A1* | 8/2010 | Kosai | H04W 52/267 701/36 |
| 2010/0203835 A1* | 8/2010 | Ryu | H04W 56/0015 455/41.2 |
| 2011/0250836 A1* | 10/2011 | Guha | H04B 1/719 455/39 |

FOREIGN PATENT DOCUMENTS

JP  2008017484 A  1/2008
WO  WO2005064863 A1  7/2005

OTHER PUBLICATIONS

Harks, Tobias and Poschwatta, Tobias, Congestion control in utility fair networks, Jun. 28, 2008, Computer Networks, vol. 52, pp. 2497-2451.*

IEEE Vehicular Technology Society, IEEE Standard for Wireless Access in Vehicular Environments (WAVE)—Multi-channel Operation, Feb. 7, 2011, IEEE Std 1609.4-2010, pp. 1-25.*

PCT International Search Report dated Feb. 28, 2012 for corresponding PCT/EP2011/068750 with English translation.

German Office Action dated Mar. 22, 2012 for corresponding DE 10 2011 077 882.9, with English Translation.

Japanese Office Action dated Nov. 5, 2014 for corresponding JP 2014-516208, with English Translation.

* cited by examiner

RADIO TRANSMISSION/RADIO RECEPTION DEVICE AND METHOD FOR COMMUNICATION WITHIN A, IN PARTICULAR WIRELESS, MOTOR VEHICLE COMMUNICATION SYSTEM INTERACTING IN AD-HOC FASHION

This application is the National Stage of International Application No. PCT/EP2011/068750, filed Oct. 26, 2011, which claims the benefit of German Patent Application No. 10 2011 077 882.9, filed Jun. 21, 2011. The entire contents of these documents are hereby incorporated herein by reference.

FIELD

The present embodiments relate to a radio transmission/radio reception device for communication within a motor vehicle communication system interacting in ad-hoc fashion.

BACKGROUND

Radio transmission/radio reception devices for communication within a motor vehicle communication system interacting in ad-hoc fashion (e.g., wireless) are being used for communication between road users with one another. Interacting in ad-hoc fashion provides ad-hoc networks (e.g., essentially self-organizing networks formed or operated spontaneously by direct communication of the network nodes involved). Road traffic communication includes motor vehicles, which is why the communication is also referred to as "car to car" (C2C) communication. However, this communication also includes communication to the traffic infrastructure that is formed, for example, by base stations formed by "roadside units" such as, for example, traffic lights, for conveying the communication or propagating information to the information networks connected to the traffic light or controlling traffic centers. This communication is referred to as "car to infrastructure" (C2I). Since, in principle, motor vehicles do not represent the only road users, but bicycles or bicycle riders and pedestrians are also involved, this communication also includes the exchange of data between radio transmission/radio reception devices operated by bicycles or bicycle riders and pedestrians and the radio transmission/radio reception devices operated by motor vehicles. There is no term or acronym for these, but the communications are included in the term of "car to X" technology or communication (C2X) known for the generalization of this type of communication.

In this context, C2C, C2I, and C2X is to be distinguished from the known mobile radio communication since the former takes place in automated fashion (e.g., predominantly without triggering or required actions by the user) and serves the purpose of collecting and exchanging traffic-related data so that it is possible to respond appropriately to all possible traffic situations (e.g., by warnings to the user or automated responses by the motor vehicle).

For the collection of data and the exchange thereof, it is known that each motor vehicle of the plurality of motor vehicles sends out a cyclic message at an interval of a few seconds that contains a vehicle ID and information on speed, direction, and position. The sending out of these standard cyclic messages (e.g., "beacons") additionally to other messages, especially on much-traveled traffic routes, may lead to overload situations. For example, blocking of pending data may occur since the resources provided for the wireless motor vehicle communication are limited. If other road users such as pedestrians and bicycles are also added to this, the situation is additionally aggravated.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the characteristics of a motor vehicle communication system interacting in ad-hoc fashion are improved.

One embodiment of a radio transmission/radio reception device (e.g. radio transceiver) for communication within a motor vehicle communication system (e.g., a wireless motor vehicle communication system) interacting in ad-hoc fashion is configured to emits an information item about the range of messages provided. At least one further radio transmission/radio reception device receives the information, and based on the received information, a frequency of the emission of successive messages over time is specified by the further radio transmission/radio reception device.

This provides that the loading of communication channels is adapted to the local and current conditions and thus, for example, safety-related messages may be sent out with less delay and largely unblocked. In this context, the frequency of the emission has a direct effect on the loading so that very rapid resource relief is provided.

The radio transmission/radio reception device according to one embodiment is configured for the communication between road users among one another and/or between road users and traffic infrastructure.

This provides that, in principle, all those involved in the traffic may make a contribution to enhancing the traffic safety since the radio transmission/radio reception device according to one embodiment is suitable for providing both communication to road user vehicles (e.g., in cars and motorcycles or other vehicles), and also implemented in terminals such as cell phones or PDAs that provide for traffic-related communication with pedestrians and cyclists and their devices, respectively. The contribution is also produced due to the fact that a communication to the traffic infrastructure (e.g., notably stationary traffic devices such as traffic lights and the like, equipped with radio transmission/radio reception devices) may take place so that this device may produce a response configured to traffic situations via a link with traffic centers. Both types of communication combined provide for the greatest penetration or most accurate statements on the traffic situation in this context.

In one embodiment, a radio transmission/radio reception device is configured for data transmission according to a dedicated short-range radio communication standard (e.g., the Dedicated Short Range Communication, "DSRC"). Such short-range radio standards are particularly suitable for communication between vehicles and other mobile road users, because of the DSRC standard. For example, this works very well integrated with the WLAN Standard 802.11 and its derivative such as 802.11a/b/e/g/n/p. If the radio transmission/radio reception device is to be operated in Europe, it is advantageous if the radio transmission/radio reception device is configured for data transmission according to the Wireless Access in Vehicular Environments, "WAVE", standard or derivatives thereof.

A defined radio interface of the radio transmission/radio reception device is then obtained if the radio transmission/radio reception device is configured for data transmission at least partially according to IEEE 1609.4 and/or ETSI Intelligent Transportation Systems, "ITS" standards or its derivatives.

In this context, wide distribution and penetration is brought by the development in which the radio transmission/radio reception device is configured for a data transmission at least partially according to IEEE802.11 standards or its derivatives (e.g., IEEE 802.11p since many portable devices such as cell phone, PDA, has such a WLAN interface so that these devices may be utilized without great modifications for traffic-related communication among road users. The development utilizing the IEEE 802.11p derivative is very reliable in the case of rapidly moving objects such as motorized vehicles.

This reliability of IEEE 802.11p also renders the development advantageous in that the radio transmission/radio reception device is configured for a higher-priority first (e.g., safety-related) data transmission according to IEEE 802.11p. Utilization according to IEEE 802.11e also has this advantage. This may also be due to the prioritization that may be carried out accordingly.

As an alternative or additionally, the radio transmission/radio reception device is configured for a second lower-priority (e.g., subscriber-individual) data transmission according to IEEE 802.11 a/b/g. For example, in the case of the division into subscriber-individual data such as, for example, information retrievals on the Internet and safety-related information, this development may increase the possibilities and frequencies of transmission for the safety-related data transmissions.

For safety-relevance and traffic control, the development is of advantage in that the radio transmission/radio reception device is configured in such that the messages include status messages about the status of a road user.

As an alternative or additionally, the radio transmission/radio reception device may utilize, for the emission of messages, a control channel (e.g., the control channel "CCH" or a service channel such as the service channel "SCH"). These channels are treated preferentially in the data transmission, for example, in that radio resources are reserved and kept available for the channels exclusively. This also increases the performance in, for example, the case of high-priority data that may relate to or increase the traffic safety.

The radio transmission/radio reception device is developed such that the information about the range of messages provided is based on messages prepared for dispatch by the radio transmission/radio reception device by the radio transmission/radio reception device, present in a data memory allocated to the radio transmission/radio reception device. The information about the range is directly correlated with the loading of the channels to be expected so that this provides for a relatively precise prediction of the coming loading.

If the radio transmission/radio reception device is developed such that the range is configured as a first value belonging to the integer set of numbers, reproducing the number of the messages to be dispatched (e.g., designated as "channelLoadtoNeighbors"), this provides a value that is easily determined, simple to be coded, for controlling the following acts.

In one embodiment, the radio transmission/radio reception device is developed such that the first value is conveyed at least with a part of messages to be transmitted (e.g., in every message). This provides for good updating of the state of loading of the system. Additional header data that would be necessary if the information were to be sent out separately from other messages is avoided, thereby reducing data load. Furthermore, it is provided for, especially in the case of suitably selected dimensioning of the coding of the value, that any unused bit data fields of the header part of the messages may be utilized for coding so that the transmission of the value creates no additional load at all.

A possibility to be implemented and decoded simply is offered when the radio transmission/radio reception device is configured such that the first value is conveyed within a message field of the data transmission of the message.

In supplement thereto, the radio transmission/radio reception device may be configured such that the message field is configured as a field having a fixed bit width. A defined width facilitates decoding, the width of 4 bits, for example, being appropriate for most of the message sets to be expected.

If the radio transmission/radio reception device is configured in such that, as a further radio transmission/radio reception device, forms based on first values received by adjacent radio transmission/radio reception devices (e.g., all adjacent radio transmission/radio reception devices), a second value belonging to the integer set of numbers, designated as "channelLoadfromNeighbors", further behavior with regard to the messages to be transmitted may be based on a very precise image of the future position. Although the individual neighbors may change, especially due to the mobility, in the aggregate, the number of stations frequently remains almost identical up to changing little, so that the previously communicated number of messages to be transmitted, even if the stations subsequently may no longer be neighbors, still provide a good estimate of the coming state of loading.

The radio transmission/radio reception device is configured such that when a first threshold value, designated as "channelLoadfromNeighbors_active." is exceeded by the second value, the frequency of the emission of successive messages over time is specified at a third value. Comparisons of threshold value are easily to be implemented method acts for controlling systems. The values may be optimized, for example, by simulations and also adapted at a later time.

If the radio transmission/radio reception device is configured such that when a second value, designated especially as "channelLoadfromNeighbors_restrictive", is exceeded by the second value, the frequency of the emission of successive messages over time is specified at a fourth value, a further act of escalation or finer grading of the reaction of the system to the state of loading may be produced in a simple manner.

In one embodiment, the radio transmission/radio reception device is configured such that when the second threshold value is undercut by the second value, the frequency of the emission of successive messages over time is specified at the third value. This development may be provided for a graded release of resource for the sending out of low-priority data.

Additionally, the radio transmission/radio reception device may be configured such that when the first threshold value is undercut by the second value, the frequency of the emission of successive messages over time is specified at a fifth value. This achieves a further de-escalation or release stage that provides for finer adaptation to the conditions.

If the radio transmission/radio reception device is configured such that the first and/or second threshold value are specified such that the difference of values is greater than zero (e.g., five), a hysteresis may be implemented so that rapid interfering oscillation of the system between a number of threshold values is avoided. This value, too, may be optimized by simulations and is changed subsequently.

The radio transmission/radio reception device according to one embodiment is configured such that the third, fourth and/or fifth value are formed according to defined system states of a decentralized load control designated as "Decentralized Congestion Control" prescribed especially according to the ETSI TS 102 687 standard. As a result, predefined states are utilized, which makes an implementation less complex and also additionally provides for the utilization of other characteristics defined by the system such as, for example, the signaling of states and/or the corresponding treatment of (over-) load states of the system.

Further penetration is achieved if the radio transmission/radio reception device is configured such that the radio transmission/radio reception device is configured for communication with road users at least partially according to the European standard ETSI TC ITS, the Amerimay so-called "Vehicle Safety Communications Program, VSC" or the Japanese "Advanced Vehicle Safety Program, AVS". By this, the device according to the present embodiments becomes usable in various parts of the world.

In one embodiment, the radio transmission/radio reception device or the associated method, respectively, performs the communication with road users at least partially according to a mobile radio standard such as GSM, UMTS or derivatives thereof. This is advantageous, for example, for better penetration and acquisition since pedestrians and cyclists that are in possession of a mobile radio device (e.g., mobile phone) may also be integrated into the communication as road users as already indicated, and thus, a comprehensive overall picture of the traffic may be formed.

This is advantageously supplemented or, respectively, the alternative also becomes available to develop the radio transmission/radio reception device such that the radio transmission/radio reception device is configured for communication with road users at least partially according to the ISO standard "continuous-air long and medium range", CALM. The device may thus be utilized not only worldwide but also without changes or national adaptations that is appropriate for the concept of mobility of vehicles.

In one embodiment, a method for communication within a motor vehicle communication system (e.g., a wireless motor vehicle communication system) interacting in ad-hoc fashion is provided.

A first radio transmission/radio reception device emits an information item about the range of messages provided At least a further radio transmission/radio reception device receives the information, and based on the received information, a frequency of the emission of successive messages over time is specified by the further radio transmission/radio reception device.

This method allows an increase in the exploitation of the advantages of controlling the loading in favor of traffic safety.

Developments of the method offer "mutatis mutandis" the same advantages as the corresponding developments of the arrangement, in each case with the additional advantage of contribution to the implementation of the advantage of the subject matter.

DETAILED DESCRIPTION

Figure 1:
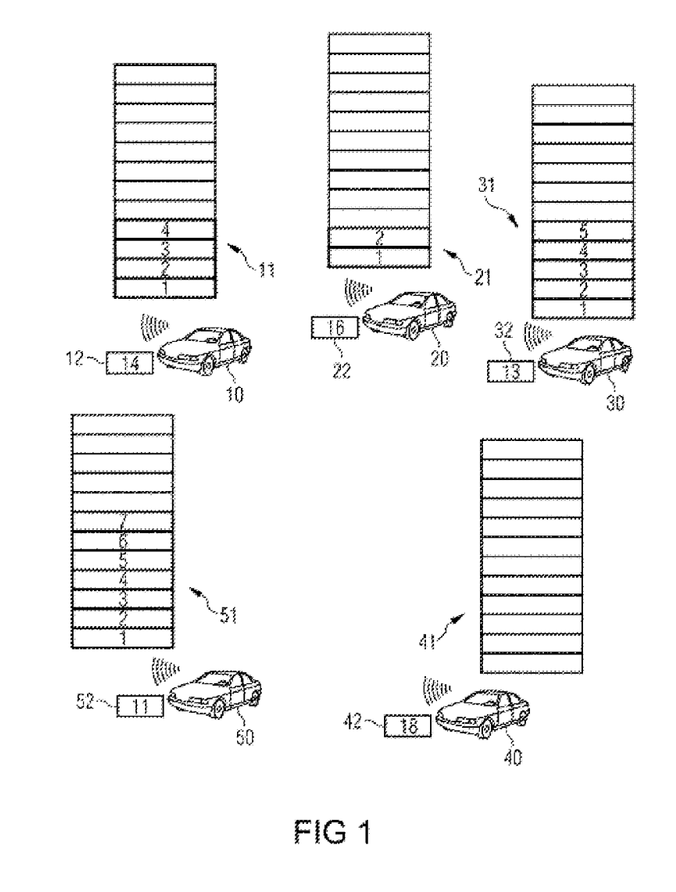
FIG. 1 diagrammatically depicts the situation of road users in a mobile ad-hoc network.

FIG. 1 depicts an ad-hoc network capable of wireless motor vehicle communication. This is a network designed according to ETSI TC ITS. As an alternative, the network may also be a CALM network standardized according to ISO or a network that is formed according to the "Vehicle Safety Communications Program, VSC" or the Japanese "Advanced Vehicle Safety Program, AVS."

The representation according to FIG. 1 includes 5 road users 10, 20, 30, 40, 50 (e.g., vehicles or persons who carry a corresponding communication device such as a WLAN-capable cell phone) who, as subscribers to a mobile ad-hoc network, communicate with one another (e.g., based on the WLAN standard IEEE 802.11p).

As an alternative, or additionally, IEEE 802.11e, IEEE 802.11 a/b/g/n, or IEEE 1609.4 may be used alone or in any combination in mixed operation.

In this context, the frequency band used is established, for example, in the 5 Ghz band.

Apart from the WLAN standards mentioned, a GSM infrastructure, comparable to one implemented, for example, also in eCall systems, may be utilized for the ad-hoc communication of the vehicle/infrastructure (C2X) (e.g., in the case of the involvement of persons).

The radio transmission/radio reception devices are in this context integrated in the terminals of the persons or in the vehicles and the infrastructure. Thus, the road users and the traffic infrastructure may be ideally distributed area-wide so that, in the text that follows, road user and traffic infrastructure is used as a simplifying designation for radio transmission/radio reception device.

If no portable terminals equipped with the radio transmission/radio reception device according to one or more of the present embodiments are used in the vehicle by persons in the vehicle for motor vehicle communication, who communicate wirelessly with functional groups of the motor vehicle, the radio transmission/radio reception device may be integrated, for example, in the vehicle via a bus system such that the radio transmission/radio reception device communicates with the other functional groups of the vehicle. This may be CAN BUS. Apart from CAN BUS, however, the use of other bus systems such as LIN, MOST, Byteflight or the like may be provided.

In this context, each subscriber of the plurality of subscribers sends at periodic repetitive intervals of about 100 msec via the control channel (CCH) or service channel (SCH), provided in accordance with this standard, among other things, information about position, speed and the direction of travel.

In one embodiment, each road user of the plurality of road users 10, 20, 30, 40, 50 then emits information about the range of messages 12, 22, 32, 42, 52 provided. This information is based on the messages prepared for dispatch, present in a data memory 11, 21, 31, 41, 51 of the subscriber 10, 20, 30, 40, 50.

According to one embodiment, only the number of the messages present in the respective data memory 11, 21, 31, 41, 51 is sent. In another embodiment, the information about the entire data volume is sent, and a more accurate information item about the data sets to be expected is thus obtained.

In one embodiment, the number of pending messages is determined by an algorithm that takes into consideration, for example, the history (e.g., the number of messages sent out at an earlier time) and predicts from this a future number of possible messages. This would have the advantage, among other things, to be able to act more rapidly.

Based on the information, obtained from the other subscribers in each case, about the overall range 12, 22, 32, 42, 52 of the messages provided, each subscriber of the plurality of subscribers 10, 20, 30, 40, 50 then determines a prognosis about the loading of the mobile ad-hoc network in a predetermined period of time.

When this predicted loading then exceeds certain values, the subscribers 10, 20, 30, 40, 50 reduce the frequency of their messages or increase the time intervals between the individual messages and thus reduce the network loading to provide an effective load control.

Figure 2:
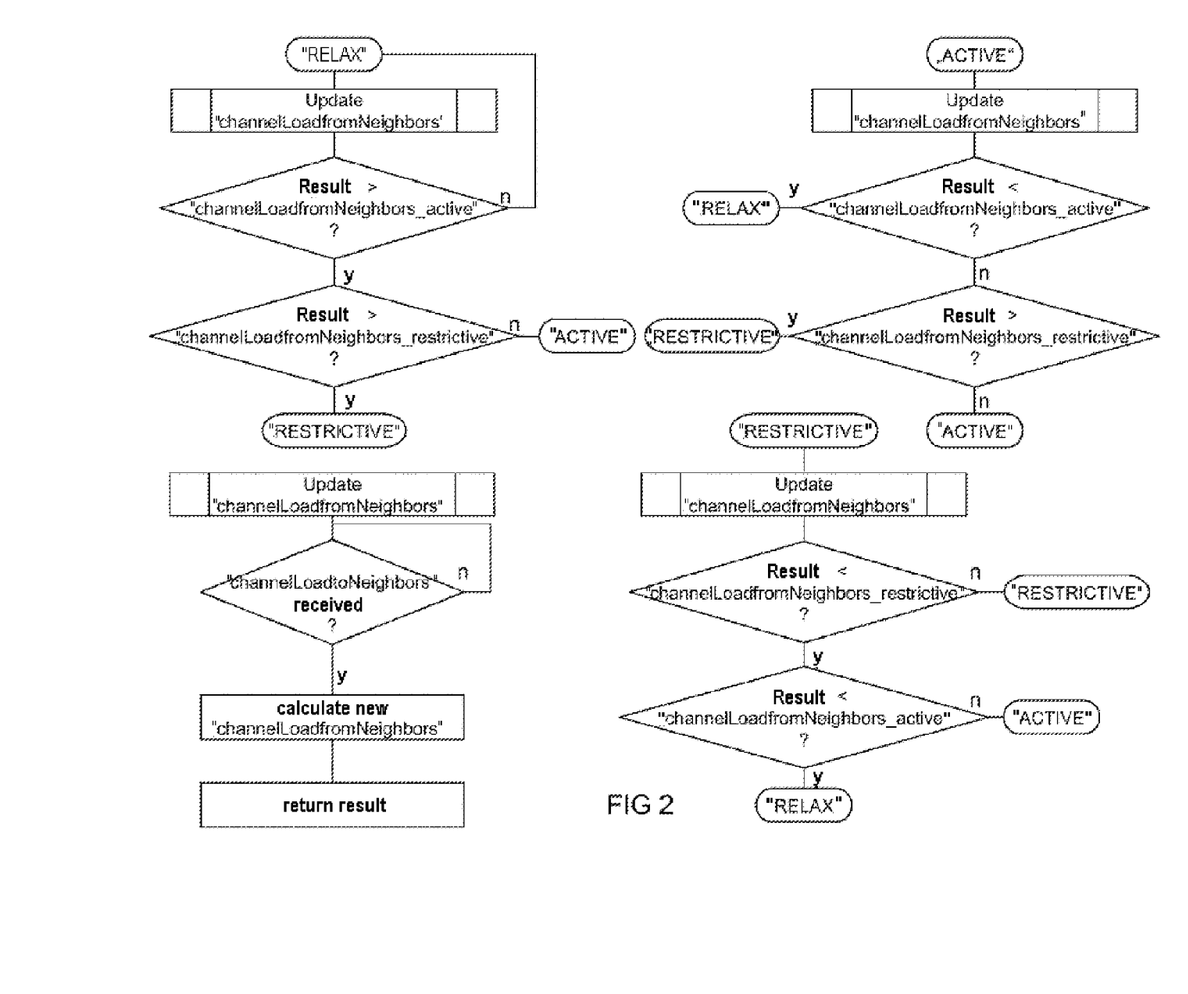
FIG. 2 depicts the sequence of an implementation of the system operating in accordance with ETSI TS 102 687.

FIG. 2 depicts a flow chart that is performed on exemplary embodiments of the method and the radio transmission/radio reception device that is configured according to ETSI TS 102 687.

Both are based in this context on the decentralized load control defined according to this standard, the "Decentralized Congestion Control" DCC.

A first state RELAX, a second state ACTIVE and a third state RESTRICTIVE are defined there. In the first state RELAX, the resource allocation moves within a normal framework and, therefore, scarcely requires regulation.

In the second state ACTIVE, the resource allocation may already meet limits and there arises the risk that further data (e.g., highly safety related data) may not be dispatched. In this state, first measures for regulation may already be required. In the third state RESTRICTIVE, an overload situation that requires stronger measures is already apparent.

This classification according to one embodiment, utilizing the known states, is performed by the conveyance of planned or pending messages in the form of the pure number or even the range of the messages.

In the example shown, this is intended to be only the number of pending messages that, for example, beginning in the first state RELAX of a subroutine, leads to the update of an indicator value "channelLoadfromNeighbors." In this context, the number may be contained by a few bits (e.g., 4 bits) coded in all messages dispatched by adjacent stations.

This is then followed, by accumulation (e.g., forming the sum over all received information about the number of pending messages "channelLoadtoNeighbors"), by a determination of messages to be expected in the immediate next time. The time used as a basis may be, for example, set as a variable "immediate next time" having values, for example, in the millisecond range.

If the update of the value of the messages to be expected "channelLoadfromNeighbors" was triggered in the first state RELAX, a first threshold value comparison takes place in that the current value of the messages to be expected "channelLoadfromNeighbors" is compared with a first threshold value "channelLoadfromNeighbors_active" representing a first escalation stage.

If the result of the comparison is that the value of the messages to be expected "channelLoadfromNeighbors" is greater than the first threshold value "channelLoadfromNeighbors_active", it is checked in a next threshold value comparison whether the value of the messages to be expected "channelLoadfromNeighbors_active" is greater than a second value, representing a second escalation stage, "channelLoadfromNeighbors_restrictive". If this is not the case, the underlying logic indicates that the loading of the resources is in a state between the second state ACTIVE and the third state RESTRICTIVE. In this state, the system, according to DCC, is placed into the state ACTIVE or, respectively, the state is signaled to the system and corresponding measures (e.g., load controlling measures) are initiated.

If, however, the case occurs that the value is thus greater, the system is in a state of overload (e.g., the third state RESTRICTIVE with the corresponding measures, identifying this system state, for regulating the load).

As the representation depicts, in both states there is also an update of the value of the messages "channelLoadfromNeighbors_active" to be expected with subsequent threshold value comparisons with the first threshold value "channelLoadfromNeighbors_active" and, optionally, with the second threshold value "channelLoadfromNeighbors_restrictive". This is because the second check is only required if the first check does not immediately indicate a change in state. However, the checks are made with a different logic.

Based on the second state ACTIVE, the first threshold value comparison is checked as to whether the value of the messages "channelLoadfromNeighbors" to be expected is smaller than the first threshold value "channelLoadfromNeighbors_active". If this is the case, the loading has become normalized (e.g., relaxed), and the system thus again assumes the first state RELAX. If this is not the case, the second threshold value check is carried out in that it is determined whether the value of the messages "channelLoadfromNeighbors" to be expected is greater than the second threshold value "channelLoadfromNeighbors_restrictive". This is because if the value has not become smaller, the possibility exists that the value has become greater. If the value is greater, the system changes to the third state RESTRICTIVE. If the value is not greater, the loading is still in the second state ACTIVE.

In contrast, the value is checked based on the third state RESTRICTIVE in the first threshold value comparison whether the value of the messages "channelLoadfromNeighbors" to be expected has become smaller than the second threshold value "channelLoadfromNeighbors_restrictive". If this is not the case, the system remains in the third state RESTRICTIVE. If, however, it is the case, the value is checked in the next act whether the value of the messages "channelLoadfromNeighbors" to be expected has even dropped to such an extent that the value is smaller than the first threshold value "channelLoadfromNeighbors_active". If this is the case the loading of the system is relaxed. Correspondingly, the first state RELAX is indicated to the system or this state is assumed, respectively, and measures for regulating the loading are also adapted (e.g., taken back completely).

If, however, the value of the messages "channelLoadfromNeighbors" to be expected is not also smaller than the first threshold value "channelLoadfromNeighbors_active", then the loading of the system has only become reduced to the second state ACTIVE, and the measures for regulating the loading are then performed in accordance with this state.

By this method, the system is now capable of accounting for the development of the loading of the system in both directions (e.g., increase in the loading and decrease in the loading). However, in order for the system not to be continuously jumping between the states, the two threshold values "channelLoadfromNeighbors_restrictive" and "channelLoadfromNeighbors_active" are selected in such a manner or, respectively, the threshold value comparison is implemented in such a manner that therefore an undesired oscillation between the states will not thus occur.

For this purpose, the threshold value comparison may be achieved by setting a system variable such as "channelLoadfromNeighbors_hysteresis" having a suitable value (e.g., 5). For example, in the threshold value comparison, a change of state is initiated only when the value of the messages "channelLoadfromNeighbors" to be expected is exceeded by the corresponding threshold value plus 5 or undercut by the corresponding threshold value minus 5.

The invention is not restricted to the examples shown but include all embodiments that contain the concept defined by the claims, and achieve an equivalent effect.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A communication device for communicating within a motor vehicle communication system interacting in ad-hoc fashion, the communication device comprising:
a memory including an information item, the information item including a message quantity to be provided, the message quantity to be provided being specified as a first value, the message quantity to be provided reproducing a number of messages to be dispatched; and
a radio transceiver device configured to:
emit the information item including the message quantity to be provided, the emitted information item being received by at least one further communication device,
receive a rate of emission of successive messages over time from the at least one further communication device, the rate of emission of successive messages over time being specified by the at least one further communication device,
wherein the radio transceiver device is configured such that the first value is conveyed at least with a part of the messages to be transmitted, and
wherein the radio transceiver device is configured to receive the rate of emission of successive messages over time specified as a second value based on the first value received by the at least one further communication device;
transmit the messages at the rate of emission of successive messages based on the second value, wherein the first value is conveyed at least with part of the messages to be transmitted with each message of the plurality of messages.

2. The communication device as claimed in claim 1, wherein the communication device is designed for the communication between road users among one another, between road users and traffic infrastructure, or between road users among one another and between road users and traffic infrastructure.

3. The communication device as claimed in claim 1, wherein the radio transceiver device is configured for data transmission according to a dedicated short-range radio communication standard.

4. The communication device as claimed in claim 3, wherein the radio transceiver device is configured for data transmission according to a Wireless Access in Vehicular Environments standard.

5. The communication device as claimed in claim 4, wherein the radio transceiver device is configured for data transmission at least partially according to IEEE 1609.4, ETSI Intelligent Transportation Systems standards or IEEE 1609.4 and ETSI Intelligent Transportation Systems standards.

6. The communication device as claimed in claim 4, wherein the radio transceiver device is configured for a data transmission at least partially according to IEEE 802.11 standards.

7. The communication device as claimed in claim 6, wherein the radio transceiver device is configured for a higher-priority first data transmission according to IEEE 802.11e or IEEE 802.11p.

8. The communication device as claimed in claim 6, wherein the radio transceiver device is configured for a second lower-priority data transmission according to IEEE 802.11 a/b/g.

9. The communication device as claimed in claim 1, wherein the messages comprise status messages about a state of a road.

10. The communication device as claimed in claim 1 wherein the radio transceiver device is configured such that for the emission of messages, a control channel and a service channel are utilized.

11. The communication device as claimed in claim 1, wherein the information item including the quantity of messages to be provided is based on messages prepared for dispatch by the communication device, present in a data memory allocated to the communication device.

12. The communication device as claimed in claim 1, wherein the first value belongs to an integer set of numbers.

13. The communication device as claimed in claim 1, wherein the radio transceiver device is configured such that the first value is conveyed within a message field of the data transmission of the message.

14. The communication device as claimed in claim 13, wherein the message field is a field having a fixed bit width.

15. The communication device as claimed in claim 1, wherein the radio transceiver device is configured such that when a first threshold value is exceeded by the second value, the rate of emission of successive messages over time is specified at a third value.

16. The communication device as claimed in claim 15, wherein the radio transceiver device is configured such that when a second threshold value is exceeded by the second value, the rate of emission of successive messages over time is specified at a fourth value.

17. The communication device as claimed in claim 16, wherein the radio transceiver device is configured such that when the second threshold value is undercut by the second value, the rate of emission of successive messages over time is specified at the third value.

18. The communication device as claimed in claim 17, wherein the radio transceiver device is configured such that when the first threshold value is undercut by the second value, the rate of emission of successive messages over time is specified at a fifth value.

19. The communication device as claimed in claim 18, wherein the radio transceiver device is configured such that the first threshold value, the second threshold value, or the first threshold value and the second threshold value are specified such that a difference of values is greater than zero.

20. The communication device as claimed in claim 19, wherein the radio transceiver device is configured such that the third value, the fourth value, the fifth value, or any combination thereof, according to defined system states, forms a decentralized load control according to the ETSI TS 102 687 standard.

21. The communication device as claimed in claim 20, wherein the radio transceiver device is configured such that communication with road users takes place at least partially according to a mobile radio standard.

22. The communication device as claimed in claim 20, wherein the communication device is configured for communication with road users at least partially according to the European standard ETSI TC ITS, the American "Vehicle Safety Communications Program, VSC" or the Japanese "Advanced Vehicle Safety Program, AVS".

23. The communication device as claimed in claim 22, wherein the communication device is configured for communication with road users at least partially according to the ISO standard, "continuous-air long and medium range".

24. A method for communication within a motor vehicle communication system interacting in ad-hoc fashion, the method comprising:
  emitting, by a first radio transceiver device within the motor vehicle communication system, an information item including a quantity of messages to be provided, the quantity of messages to be provided being reproduced as a first value and reproducing a number of messages to be dispatched;
  receiving, by at least one second radio transceiver device, the information;
  receiving, by the first radio transceiver device, a rate of emission of messages by the first radio transceiver device to the at least one second radio transceiver device over time,
  wherein the rate of emission of messages over time is specified by the at least one second radio transceiver device;
  conveying, by the first radio transceiver device, the first value with at least a part of the messages to be transmitted;
  wherein the receiving, by the first radio transceiver device, comprises receiving the rate of emission of messages over time specified as a second value based on the first value received by the at least one second radio transceiver device; and
  transmitting the messages at the rate of emission of messages based on the second value, wherein the first value is conveyed at least with part of the messages to be transmitted with each message of the plurality of messages.

25. The method as claimed in claim 24, wherein the communication between road users takes place among one another, between road users and traffic infrastructure, or among one another and between road users and traffic infrastructure.

26. The method as claimed in claim 24, wherein the data transmission takes place according to a dedicated short-range radio communication standard.

27. The method as claimed in claim 26, wherein the data transmission takes place according to Wireless Access in Vehicular Environments standard.

28. The method as claimed in claim 27, wherein the data transmission takes place at least partially according to IEEE 1609.4, ETSI Intelligent Transportation Systems standards or IEEE 1609.4 and ETSI Intelligent Transportation Systems standards.

29. The method as claimed in claim 27, wherein the data transmission takes place at least partially according to IEEE 802.11 standards.

30. The method as claimed in claim 29, wherein a higher-priority first data transmission is formed according to IEEE 802.11e or IEEE 802.11p.

31. The method as claimed in claim 28, wherein a lower-priority second data transmission is formed according to IEEE 802.11 a/b/g.

32. The method as claimed in claim 24, wherein the messages comprise status messages about a state of a road user.

33. The method as claimed in claim 24, wherein for emission of messages, a control channel and a service channel are utilized.

34. The method as claimed in claim 24, wherein the information including the quantity of messages to be provided is based on messages prepared for dispatch by the radio transceiver device, present in a data memory allocated to the radio transceiver device.

35. The method as claimed in claim 24, wherein the first value belongs to an integer set of numbers.

36. The method as claimed in claim 24, wherein the first value is conveyed within a message field of the data transmission of one of the messages.

37. The method as claimed in claim 36, wherein a field having a fixed bit width is used for the message field.

38. The method as claimed in claim 24, wherein when a first threshold value is exceeded by the second value, the rate of emission of messages over time is specified at a third value.

39. The method as claimed in claim 38, wherein when a second threshold value is exceeded by the second value, the rate of emission of messages over time is specified at a fourth value.

40. The method as claimed in claim 39, wherein when the second threshold value is undercut by the second value, the rate of emission of messages over time is specified at the third value.

41. The method as claimed in claim 40, wherein when the first threshold value is undercut by the second value, the rate of emission of messages over time is specified at a fifth value.

42. The method as claimed in claim 41, wherein the first threshold value and the second threshold value are specified such that a difference of values is greater than zero.

43. The method as claimed in claim 42, wherein the third value, the fourth value, the fifth value or any combination thereof is formed according to defined system states of a decentralized load control according to the ETSI TS 102 687 standard.

44. The method of claim 24, wherein communication with road users takes place at least partially according to a mobile radio standard.

45. The method as claimed in claim 24, wherein the communication with road users takes place at least partially according to the European standard ETSI TC ITS, the American "Vehicle Safety Communications Program, VSC" or the Japanese "Advanced Vehicle Safety Program, AVS".

46. The method as claimed in claim 45, wherein the communication with road users takes place at least partially according to the ISO standard, "continuous-air long and medium range".

* * * * *